(12) United States Patent
Matsumoto

(10) Patent No.: US 12,059,929 B2
(45) Date of Patent: Aug. 13, 2024

(54) PNEUMATIC TIRE

(71) Applicant: The Yokohama Rubber Co., LTD., Tokyo (JP)

(72) Inventor: Kenichi Matsumoto, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 733 days.

(21) Appl. No.: 17/260,206

(22) PCT Filed: May 29, 2019

(86) PCT No.: PCT/JP2019/021218
§ 371 (c)(1),
(2) Date: Jan. 13, 2021

(87) PCT Pub. No.: WO2020/012808
PCT Pub. Date: Jan. 16, 2020

(65) Prior Publication Data
US 2021/0268840 A1 Sep. 2, 2021

(30) Foreign Application Priority Data
Jul. 13, 2018 (JP) ................. 2018-133662

(51) Int. Cl.
*B60C 11/03* (2006.01)
*B60C 11/12* (2006.01)

(52) U.S. Cl.
CPC ...... *B60C 11/0304* (2013.01); *B60C 11/1236* (2013.01); *B60C 11/1263* (2013.01);
(Continued)

(58) Field of Classification Search
CPC ............. B60C 11/0304; B60C 11/1236; B60C 11/1263; B60C 2011/0348;
(Continued)

(56) References Cited

U.S. PATENT DOCUMENTS 5,804,000 A 9/1998 Shirai et al.
2005/0269004 A1 12/2005 Miyabe et al.
(Continued)

FOREIGN PATENT DOCUMENTS

DE 4424272 A1 * 1/1996 ......... B60C 11/0309
DE 696 18 926 9/2002
(Continued)

OTHER PUBLICATIONS

Kubota, English Machine Translation of JP 2016113003, 2016 (Year: 2016).*

(Continued)

*Primary Examiner* — Justin R Fischer
*Assistant Examiner* — Brendon Charles Darby
(74) *Attorney, Agent, or Firm* — Thorpe North & Western

(57) ABSTRACT

A tread pattern of a pneumatic tire includes: first and second circumferential main grooves; a first circumferential narrow groove between the first and second circumferential main grooves, the first circumferential narrow groove having a narrower width than the first and second circumferential main grooves; an intermediate lug groove extending from the second circumferential main groove toward the first circumferential narrow groove, the intermediate lug groove being closed without reaching the first circumferential narrow groove; and a sipe extending from the closed end of the intermediate lug groove to connect the closed end with the first circumferential narrow groove. No lug grooves are between the first circumferential main groove and the first circumferential narrow groove, and a groove wall of the first circumferential main groove on a side of the first circumferential narrow groove circumnavigates without interruption in the tire circumferential direction.

11 Claims, 5 Drawing Sheets

(52) U.S. Cl.
CPC ............... *B60C 2011/0348* (2013.01); *B60C 2011/0372* (2013.01); *B60C 2011/0381* (2013.01)

(58) Field of Classification Search
CPC ..... B60C 2011/0372; B60C 2011/0381; B60C 2011/0383
See application file for complete search history.

(56) References Cited

U.S. PATENT DOCUMENTS

| | | | |
|---|---|---|---|
| 2006/0137789 A1* | 6/2006 | Shirouzu | B60C 11/0318 152/209.8 |
| 2011/0024012 A1 | 2/2011 | Iwai | |
| 2014/0345764 A1 | 11/2014 | Bourgeois et al. | |
| 2015/0210122 A1* | 7/2015 | Shimizu | B60C 11/0304 152/209.25 |
| 2016/0144665 A1* | 5/2016 | Koishikawa | B60C 11/0302 152/209.1 |
| 2016/0152090 A1* | 6/2016 | Takemoto | B60C 11/1376 152/209.24 |
| 2018/0207993 A1* | 7/2018 | Kuriyama | B60C 11/0304 |
| 2019/0283505 A1 | 9/2019 | Kuriyama | |

FOREIGN PATENT DOCUMENTS

| | | | |
|---|---|---|---|
| DE | 10 2010 042 836 | | 5/2011 |
| JP | 2003-285610 | | 10/2003 |
| JP | 2010126076 A | * | 6/2010 |
| JP | 2011-031773 | | 2/2011 |
| JP | 2015-500166 | | 1/2015 |
| JP | 2016113003 A | * | 6/2016 |
| JP | 2017190077 A | * | 10/2017 |
| JP | 2017-196974 | | 11/2017 |
| JP | 2018-012372 | | 1/2018 |
| KR | 2004027035 A | * | 4/2004 |
| WO | WO 97/14567 | | 4/1997 |
| WO | WO 03/082610 | | 10/2003 |
| WO | WO 2013/083429 | | 6/2013 |
| WO | WO-2017018161 A1 | * | 2/2017 ......... B60C 11/0304 |
| WO | WO 2017/187740 | | 11/2017 |
| WO | WO 2018/016302 | | 1/2018 |

OTHER PUBLICATIONS

Suzuki. English Machine Translation of JP 2010126076, 2010 (Year: 2010).*

Cho, English Machine Translation of KR 20040027035, 2004 (Year: 2004).*

Frerichs, English Machine Translation of DE 4424272, 1996 (Year: 1996).*

Oizumi, English Machine Translation of JP 2017190077, 2017 (Year: 2017).*

International Search Report for International Application No. PCT/JP2019/021218 dated Aug. 20, 2019, 4 pages, Japan.

* cited by examiner

PNEUMATIC TIRE

TECHNICAL FIELD

The present technology relates to a pneumatic tire.

BACKGROUND ART

A typical method of improving wet performance of a pneumatic tire is to ensure drainage properties by forming lug grooves extending in a tire circumferential direction as well as main grooves extending in a tire width direction in a tread surface of the tire. However, in such a method, there is a problem that, because the groove volume increases, the popping sound generated during running increases and that the tire noise (hereinafter, referred to as noise performance) increases. On the other hand, when a tread pattern provided with main grooves and lug grooves is formed into a tread pattern in which sipes are provided instead of lug grooves to reduce the groove volume, the popping sound is reduced and the noise performance is improved. However, drainage properties cannot be ensured due to the decrease in groove volume, and wet performance deteriorates.

For example, a pneumatic tire that can improve wet performance and noise performance in a well-balanced manner while maintaining steering stability performance is known (see Japan Unexamined Patent Publication No. 2011-31773).

The tread pattern of this pneumatic tire includes a pair of crown main grooves extending continuously in the tire circumferential direction, a pair of shoulder main grooves extending continuously in the tire circumferential direction, an outer side of the crown main grooves in a tire axial direction, a crown rib extending between the pair of crown main grooves, and a pair of middle ribs extending between the crown main grooves and the shoulder main grooves. The middle rib is divided into an inner middle portion and an outer middle portion by one middle subsidiary groove extending continuously in the tire circumferential direction. Inner middle lug grooves extending from middle subsidiary grooves toward a tire equator side and terminating without communicating with the crown main grooves are provided in the tire circumferential direction in the inner middle portion, and outer middle lug grooves extending from the shoulder main grooves toward the tire equator side and terminating without communicating with the middle subsidiary grooves are provided in the tire circumferential direction in the outer middle portion.

SUMMARY

In the pneumatic tire described above, wet performance and noise performance can be improved in a well-balanced manner while maintaining steering stability performance. However, it is desirable to improve wet steering stability performance and noise performance in a high-speed region (for example, a speed of 80 km/hr or higher) and a low-speed region (for example, a speed of 60 km/hr or less). Particularly, it is important to improve the noise performance while simultaneously improving the wet steering stability performance in the low-speed region and the steering stability performance in the high-speed region.

The present technology provides a pneumatic tire with improved wet steering stability performance and noise performance in a high-speed region and a low-speed region.

An aspect of the present disclosure is a pneumatic tire including a tread pattern. The tread pattern includes:

a first circumferential main groove provided on a first side in a tire width direction with respect to a tire equator line to extend in a tire circumferential direction;

a second circumferential main groove provided on an outer side of the first circumferential main groove in the tire width direction to extend in the tire circumferential direction;

a first circumferential narrow groove provided in a region between the first circumferential main groove and the second circumferential main groove to extend in the tire circumferential direction, the first circumferential narrow groove having a narrower groove width than the first circumferential main groove and the second circumferential main groove;

a plurality of intermediate lug grooves provided in the region to extend from the second circumferential main groove toward the first circumferential narrow groove, the plurality of intermediate lug grooves being closed without reaching the first circumferential narrow groove and disposed at intervals in the tire circumferential direction; and a plurality of sipes provided in the region to extend from a closed end of each of the intermediate lug grooves to connect the closed end with the first circumferential narrow groove, the plurality of sipes being disposed at intervals in the tire circumferential direction.

No lug grooves are provided in a region between the first circumferential main groove and the first circumferential narrow groove, and a groove wall of the first circumferential main groove on a side of the first circumferential narrow groove being a wall that circumnavigates without interruption in the tire circumferential direction.

Preferably, the first circumferential narrow groove is provided on a side of the first circumferential main groove in the tire width direction rather than a center position in the tire width direction of the region.

Preferably, a length in the tire width direction of the intermediate lug groove is from 30 to 70% of a length in the tire width direction of a region between the second circumferential main groove and the first circumferential narrow groove.

Preferably, a maximum groove depth of the first circumferential narrow groove is greater than a sipe depth of the sipe at a connection portion of the first circumferential narrow groove with the sipe and is smaller than a maximum groove depth of the intermediate lug grooves.

Preferably, a shoulder land portion where a ground contact edge in the tire width direction is located is provided on an outer side of the second circumferential main groove in the tire width direction, a second circumferential narrow groove having a narrower groove width than the first circumferential main groove and the second circumferential main groove is provided in a region of the shoulder land portion to extend in the tire circumferential direction, and a shoulder lug groove is provided to extend from a region between the second circumferential main groove and the second circumferential narrow groove toward the outer side in the tire width direction, to intersect the second circumferential narrow groove, and to further extend toward an outer side of the second circumferential narrow groove in the tire width direction.

Preferably, a length in the tire width direction of the region between the second circumferential main groove and the second circumferential narrow groove is larger than a length in the tire width direction of a region between the first circumferential main groove and the first circumferential narrow groove.

Preferably, when Lc is a length along the tire circumferential direction between two connection positions in the tire circumferential direction at which two intermediate lug grooves adjacent in the tire circumferential direction among the intermediate lug grooves are connected to the second circumferential main groove, a position in the tire circumferential direction of an end of the shoulder lug groove on a side of the second circumferential main groove is within a range of ±30% of the length Lc from a midpoint in the tire circumferential direction between the connection positions as a center.

Preferably, when the pneumatic tire is mounted on a vehicle, the first side is a vehicle mounting inner side.

Preferably, the tread pattern includes at least two circumferential main grooves extending in the tire circumferential direction on a second side opposite the first side with respect to the tire equator line, and a region of a land portion formed by the circumferential main grooves on the second side and a region of a shoulder land portion on an outer side of the circumferential main groove on the second side in the tire width direction are not provided with a circumferential groove that extends in the tire circumferential direction to circumnavigate a circumference of the tire.

Preferably, a region between the first circumferential main groove and a third circumferential main groove closest to the tire equator line among the circumferential main grooves on the second side is not provided with a circumferential groove that extends in the tire circumferential direction to circumnavigate a circumference of the tire.

Preferably, a groove wall of the third circumferential main groove on a side of the first circumferential main groove is a wall that circumnavigates without interruption in the tire circumferential direction.

Preferably, each of the sipes is connected smoothly to one of the intermediate lug grooves.

Preferably, at least some sipes of the sipes are connected to one of the intermediate lug grooves in a bent manner.

Preferably, a sipe depth of a connection portion of the sipe with one of the intermediate lug grooves is greater than a sipe depth of a connection portion of the sipe with the first circumferential narrow groove and is smaller than a maximum groove depth of the intermediate lug grooves.

According to the pneumatic tire described above, the wet steering stability performance and the noise performance in the high-speed region and the low-speed region can be improved.

DETAILED DESCRIPTION

Figure 1:
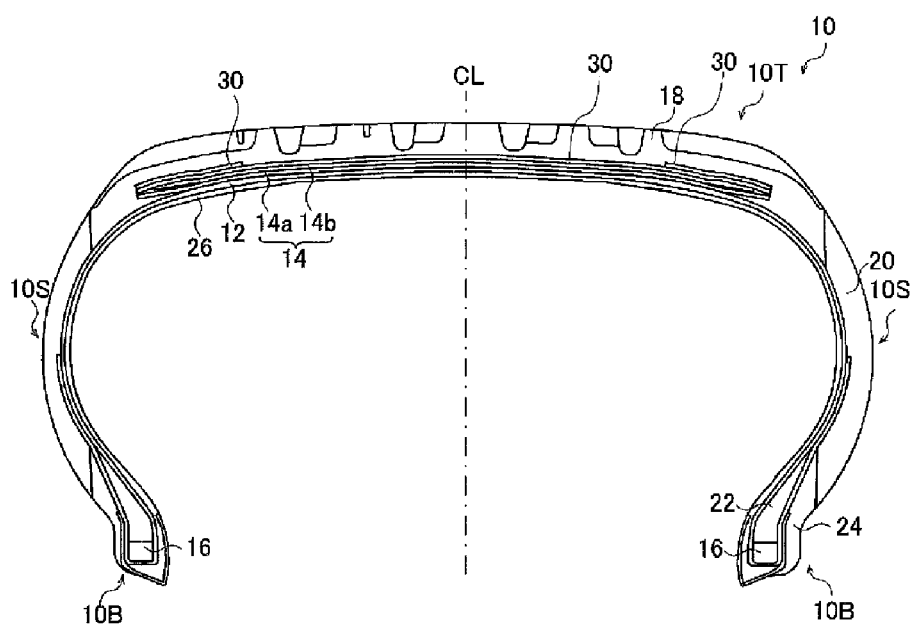
FIG. 1 is a diagram illustrating an example of a profile cross-section of a pneumatic tire according to an embodiment.

Overall Description of Tire A pneumatic tire according to an embodiment (hereinafter, simply referred to as "tire") is described below. FIG. 1 is a tire cross-sectional view illustrating an example of a profile cross-section of a tire 10.

The tire 10 is, for example, a tire for a passenger vehicle. A tire for a passenger vehicle refers to a tire specified in Chapter A of the JATMA Year Book 2012 (standards of The Japan Automobile Tyre Manufacturers Association, Inc.). The tire 10 can also be applied to a tire for a small truck specified in Chapter B or a tire for a truck or bus specified in Chapter C.

"Tire width direction" is the direction parallel to the rotation axis of the tire. "Outer side in the tire width direction" is the direction in the tire width direction away from a tire equator line CL that represents a tire equatorial plane. "Inner side in the tire width direction" is the direction in the tire width direction closer to the tire equator line CL. "Tire circumferential direction" is the direction of rotation about the rotation axis of the tire. "Tire radial direction" is the direction orthogonal to the rotation axis of the tire. "Outer side in the tire radial direction" refers to the direction away from the rotation axis. Similarly, "inner side in the tire radial direction" refers to the direction closer to the rotation axis.

Tire Structure

The tire 10 includes: a tread portion 10T including a tread pattern; a pair of bead portions 10B; and a pair of side portions 10S provided on both sides of the tread portion 10T and connecting the pair of bead portions 10B with the tread portion 10T.

The tire 10 includes: a carcass ply 12, a belt 14, and a bead core 16 as framework members and mainly includes: a tread rubber member 18, side rubber members 20, bead filler rubber members 22, rim cushion rubber members 24, and an innerliner rubber member 26 around the framework members.

The carcass ply 12 is formed of a carcass ply member that is made of organic fibers covered with rubber and wound between a pair of the annular bead cores 16 into a toroidal shape. The carcass ply 12 is wound around the bead cores 16 and extends to an outer side in the tire radial direction. The belt 14 is provided at an outer side of the carcass ply 12 in the tire radial direction and includes two belt members 14a and 14b. The belt 14 is a member formed of steel cords covered with rubber. The steel cords are inclined at a predetermined angle, for example, from 20 to 30° with respect to the tire circumferential direction. The width of the lower belt member 14a in the tire width direction is greater than the width of the upper belt member 14b in the tire width direction. The steel cords of the two belt members 14a and 14b are inclined in opposite directions. As such, the belt members 14a and 14b are crossing layers serving to suppress expansion of the carcass ply 12 due to the pressure of the air in the tire.

The tread rubber member 18 is provided on an outer side of the belt layer 14 in the tire radial direction. The side rubber members 20 are connected to both end portions of the tread rubber member 18 and form the side portions 10S. The rim cushion rubber members 24 are respectively provided at ends on an inner side of the side rubber members 20 in the tire radial direction and come into contact with a rim on which the tire 10 is mountable. The bead filler rubber member 22 is provided on an outer side of the bead core 16 in the tire radial direction so as to be interposed between a portion of the carcass ply layer 12 prior to being wound around the bead core 16 and turned up portion of the carcass ply layer 12 wound around the bead core 16. The innerliner rubber member 26 is provided in an inner surface of the tire 10 facing a tire cavity region that is filled with air and is surrounded by the tire 10 and the rim.

In addition, between the belt member 14b and the tread rubber member 18, a two-layer belt cover 30 is provided that is formed from organic fiber covered with rubber and that covers the belt 14 from an outer side of the belt 14 in the tire radial direction.

The structure of the tire 10 illustrated in FIG. 1 is an example, and the tire 10 may have other known tire structures.

Tread Pattern

Figure 2:
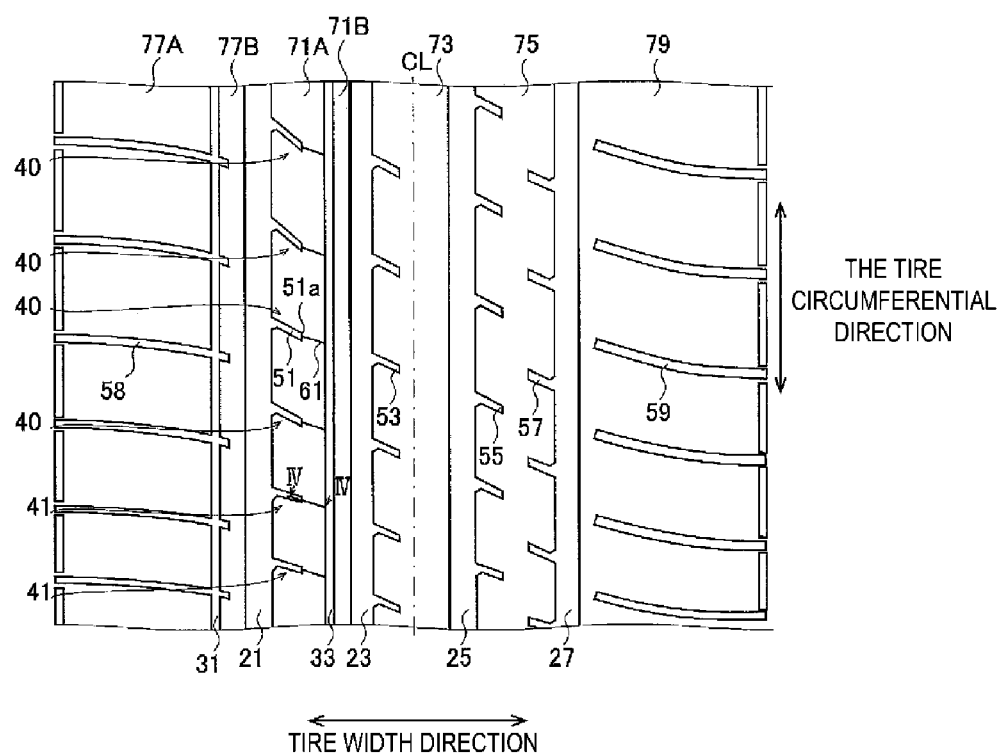
FIG. 2 is a diagram illustrating an example of a tread pattern of the tire illustrated in FIG. 1.

FIG. 2 is a diagram illustrating a portion of an example of the tread pattern of the tire 10 illustrated in FIG. 1 in a developed plan view.

The tread pattern includes circumferential main grooves 21, 23, 25, and 27 extending in the tire circumferential direction, a plurality of lug grooves 51, 53, 55, 57, 58, and 59, circumferential narrow grooves 31 and 33, and sipes 61.

The circumferential main groove 21 is a groove provided on a first side (the page left side in FIG. 2) in the tire width direction with respect to the tire equator line CL to extend in the tire circumferential direction to circumnavigate the outer circumference of the tire 10. The circumferential main groove 23 is a groove provided on an inner side of the circumferential main groove 21 in the tire width direction to extend in the tire circumferential direction to circumnavigate the outer circumference of the tire 10. Hereinafter, in order to distinguish between the circumferential main groove 23 and the circumferential main groove 21, the circumferential main groove 23 is referred to as a first circumferential main groove 23, and the circumferential main groove 21 is referred to as a second circumferential main groove 21.

The circumferential main groove 25 is a groove provided on a second side (the page right side in FIG. 2) in the tire width direction with respect to the tire equator line CL to extend in the tire circumferential direction to circumnavigate the outer circumference of the tire 10. The circumferential main groove 27 is a groove provided on an outer side of the circumferential main groove 25 in the tire width direction to extend in the tire circumferential direction to circumnavigate the outer circumference of the tire 10.

According to an embodiment, the groove widths of the circumferential main grooves 21, 23, 25, and 27 are preferably the same as each other.

In the example illustrated in FIG. 2, the first circumferential main groove 23 and the circumferential main groove 25 are provided at positions separated by the same distance from the tire equator line CL on different sides in the tire width direction with respect to the tire equator line CL, and the second circumferential main groove 21 and the circumferential main groove 27 are provided at positions separated by the same distance from the tire equator line CL on different sides in the tire width direction with respect to the tire equator line CL. However, the first circumferential main groove 23 and the circumferential main groove 25 may be provided at positions separated by different distances from the tire equator line CL on different sides in the tire width direction, and the second circumferential main groove 21 and the circumferential main groove 27 may also be provided at positions separated by different distances from the tire equator line CL on different sides in the tire width direction.

The circumferential narrow groove 31, having a narrower groove width than the first circumferential main groove 23 and the second circumferential main groove 21, is a groove extending in the tire circumferential direction to circumnavigate the outer circumference of the tire 10 and is provided in a region on an outer side of the second circumferential main groove 21 in the tire width direction (that is, in a region of a shoulder land portion where a ground contact edge in the tire width direction is located). The circumferential narrow groove 31 divides this region into a region 77A on the outer side (a side of a pattern end) in the tire width direction and a region 77B on the inner side (a side of the second circumferential main groove 21) in the tire width direction.

The circumferential narrow groove 33, having a narrower groove width than the first circumferential main groove 23 and the second circumferential main groove 21, is a groove extending in the tire circumferential direction to circumnavigate the outer circumference of the tire 10 and is provided in a region between the first circumferential main groove 23 and the second circumferential main groove 21. The circumferential narrow groove 33 divides this region into a region 71A on the outer side in the tire width direction (the side of the second circumferential main groove 21) and a region 71B on the inner side in the tire width direction (a side of the first circumferential main groove 23).

Hereinafter, in order to distinguish between the circumferential narrow groove 31 and the circumferential narrow groove 33, the circumferential narrow groove 33 refers to the first circumferential narrow groove 33, and the circumferential narrow groove 31 is referred to as the second circumferential narrow groove 31.

The first circumferential main groove 23, the second circumferential main groove 21, and the circumferential main groove 25, 27 have a groove depth of from 6.5 to 9.0 mm, for example, and have a groove width of from 5.0 to 15.0 mm, for example.

On the other hand, the first circumferential narrow groove 33 and the second circumferential narrow groove 31 have a groove depth of from 1.0 to 5.0 mm, for example, and have a groove width of from 0.8 to 3.0 mm, for example. In other words, the first circumferential narrow groove 33 and the second circumferential narrow groove 31 can be distinguished from the first circumferential main groove 23, the second circumferential main groove 21, and the circumferential main groove 25 and 27 by the dimensions of the groove depth and the groove width.

The lug groove 51 is a region between the first circumferential main groove 23 and the second circumferential main groove 21 and, in other words, is a closed groove provided in the region 71A and extending from the second circumferential main groove 21 in a direction of the first circumferential main groove 23 without reaching the first circumferential narrow groove 33. A plurality of the lug grooves 51 are disposed at intervals in the tire circumferential direction. This lug groove 51 will be referred to as an intermediate lug groove 51 to distinguish from other lug grooves.

The intermediate lug groove 51 as well as the other lug grooves 53, 55, 57, 58, and 59 are grooves extending toward one side (the page lower side in the example illustrated in FIG. 2) in the tire circumferential direction, as the grooves advance from the page left side to the page right side in the tire width direction illustrated in FIG. 2.

The lug groove 53 is a groove that extends in the tire width direction from the first circumferential main groove 23 within a region 73 between the first circumferential main groove 23 and the circumferential main groove 25 and is closed within the region 73.

The lug groove 55 extends from the circumferential main groove 25 within a region 75 between the circumferential main grooves 25 and 27 in the tire width direction and is closed within the region 75.

The lug groove 57 extends from the circumferential main groove 27 in the tire width direction and is closed within the region 75.

The extension lengths of the lug grooves 53, 55, and 57 extending in the tire width direction are smaller than half the width of a continuous land portion that forms the regions 73 and 75 and circumnavigates the outer circumference of the tire 10. As a result, a continuous land portion having high tread rigidity can be provided in the regions 73 and 75.

The lug groove 58 is a lug groove (a shoulder lug groove) that extends from a region between the second circumferential main groove 21 and the second circumferential narrow groove 31 toward the outer side in the tire width direction, intersects the second circumferential narrow groove 31, and further extends toward an outer side of the second circumferential narrow groove 31 in the tire width direction up to the pattern end on the page left side of FIG. 2.

The lug groove 59 is a lug groove that is provided in a region 79 on the outer side in the tire width direction with respect to the circumferential main groove 27 and extends from a position spaced from the circumferential main groove 27 toward the outer side in the tire width direction up to a pattern end on the page right side of FIG. 2.

The lug grooves 51, 53, 55, 57, 58, and 59 have a groove depth of from 2.0 to 7.5 mm, for example, and have a groove width of from 1.5 to 7.5 mm, for example.

The sipe 61 is provided in the region 71A and extends from a closed end 51a of each of the intermediate lug grooves 51 to connect the closed end 51a with the first circumferential narrow groove 33. A plurality of the sipes 61 are disposed at intervals in the tire circumferential direction.

The intermediate lug groove 51 forms lug grooves with sipes 40 and 41, together with the sipe 61 that is connected to the closed end 51a of the intermediate lug groove 51 and that extends up to the first circumferential narrow groove 33.

The region 71B between the first circumferential narrow groove 33 and the first circumferential main groove 23 forms a continuous land portion that continuously extends in the tire circumferential direction to circumnavigate the outer circumference of the tire 10. That is, the lug grooves are not provided in the region 71B between the first circumferential narrow groove 33 and the first circumferential main groove 23, and a groove wall of the first circumferential main groove 23 on a side of the first circumferential narrow groove 33 is a wall that circumnavigates without interruption in the tire circumferential direction.

In the tread pattern illustrated in FIG. 2, the intermediate lug groove 51 provided in the region 71A extends from the second circumferential main groove 21 toward the first circumferential narrow groove 33 and is closed without reaching the first circumferential narrow groove 33, and the sipe 61 extends from the closed end 51a of the intermediate lug groove 51 to connect the closed end 51a with the first circumferential narrow groove 33. On the other hand, lug grooves are not provided in the region 71B between the first circumferential main groove 23 and the first circumferential narrow groove 33 on an inner side of the first circumferential narrow groove 33 in the tire width direction, and the groove wall of the first circumferential main groove 23 on the side of the first circumferential narrow groove 33 is a wall that circumnavigates without interruption in the tire circumferential direction (that is, the region 71B is a continuous land portion that circumnavigates the outer circumference of the tire 10).

By providing the intermediate lug grooves 51 and the sipes 61 in the region 71A and providing the continuous land portion in the region 71B, it is possible to further improve the wet steering stability performance in the high-speed region and the low-speed region (steering stability performance on a wet road surface with a water depth of from 1 to 3 mm) and noise performance.

By providing the intermediate lug grooves 51, a drainage function of causing water entering the region 71A to flow to the outer side in the tire width direction at higher speeds (for example, speed of 80 km/hr or higher) can be exhibited in the tire 10, and by providing the sipes 61, the contact area of the tire 10 that contacts the road surface can be increased at lower speeds (for example, speed of 60 km/hr or less), the adhesion friction on wet road surfaces can be increased, and the steering stability performance can be increased. Since the sipes 61 can deform the shape of the tread rubber in accordance with the road surface, the contact area with the road surface is increased as compared to a case where the sipes 61 and the lug grooves are not present. Moreover, since the groove volume of the sipes 61 is smaller than that in a case where the lug grooves are provided, the contact area with the road surface can be increased.

In order to effectively exhibit the drainage function, the intermediate lug grooves 51 are preferably provided, so as to open to the second circumferential main groove 21, on the side of the second circumferential main groove 21 (that is, on the outer side in the tire width direction) as compared to the sipes 61.

Since the intermediate lug groove 51 extends from the second circumferential main groove 21 toward an inner side of the region 71A and is closed halfway without reaching the first circumferential narrow groove 33 and since the sipe 61 is provided between the closed end 51a and the circumferential narrow groove 33, pattern noise caused by lug grooves can be reduced and noise performance is improved, as compared to a case where the intermediate lug groove 51 connects the second circumferential main groove 21 with the first circumferential narrow groove 33.

In addition, since no lug grooves are provided at all in the region 71B positioned on the inner side in the tire width direction with respect to the region 71A, the contact area with the road surface is increased, the adhesion friction on the wet road surface is increased, and the steering stability performance can be increased. Since the continuous land portion in which no lug grooves are provided at all is formed in the region 71B closer to the tire equator line CL as compared to the region 71A, the tread rigidity of the region 71 is increased, and the initial steering response during turning can be increased.

Figure 3:
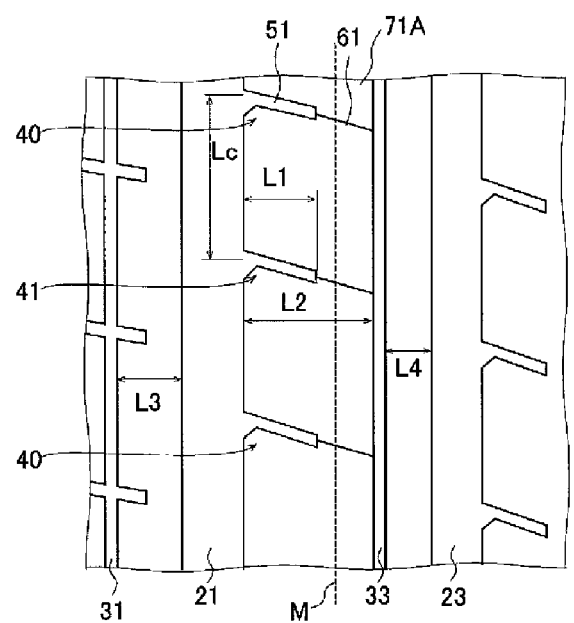
FIG. 3 is an enlarged view of main parts of the tread pattern illustrated in FIG. 2.

FIG. 3 is an enlarged view of main parts of the tread pattern illustrated in FIG. 2.

As illustrated in FIG. 3, the first circumferential narrow groove 33 is preferably provided on the side of the first circumferential main groove 23 in the tire width direction, with respect to the center position M in the tire width direction of a region between the first circumferential main groove 23 and the second circumferential main groove 21. As a result, the drainage function of the intermediate lug grooves 51 and the adhesion friction of the sipes 61 can be increased.

According to an embodiment, a length L1 (see FIG. 3) in the tire width direction of the intermediate lug groove 51 is preferably from 30 to 70% of a length L2 (see FIG. 3) in the tire width direction of the region between the second circumferential main groove 21 and the first circumferential narrow groove 33. If the length L1 is smaller than 30% of the length L2, the drainage function of the intermediate lug grooves 51 is extremely reduced. If the length L1 exceeds 70% of the length L2, it is not possible to increase the adhesion friction of the sipe 61 sufficiently, and the noise performance will degrade. The length L1 is more preferably from 40 to 60% of the length L2.

Figure 4:
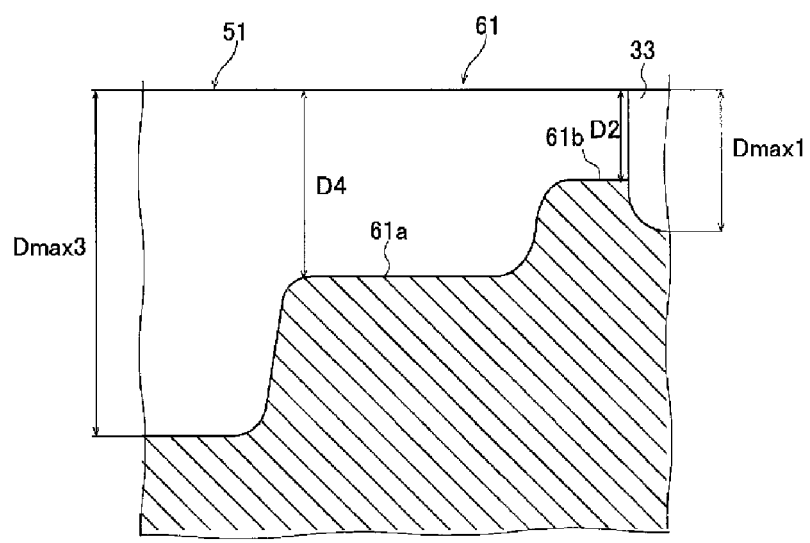
FIG. 4 is a cross-sectional view taken along the line IV-IV illustrated in FIG. 2.

FIG. 4 is a cross-sectional view taken along the line IV-IV of a region including the intermediate lug groove 51 and the sipe 61 illustrated in FIG. 2. As illustrated in FIG. 4, the sipe 61 has different sipe depths depending on a position and has sipe bottoms 61a and 61b with different bottom positions in a sipe depth direction. A portion of the sipe 61 having the sipe bottom 61b (a portion having a shallow sipe depth) is connected to the first circumferential narrow groove 33, and a portion having the sipe bottom 61a (a portion having a deeper sipe depth than the portion having the sipe bottom 61b) is connected to the intermediate lug groove 51. In this case, as illustrated in FIG. 4, a maximum groove depth Dmax1 of the first circumferential narrow groove 33 is preferably greater than the sipe depth D2 of the sipe 61 at the connection portion of the first circumferential narrow groove 33 with the sipe 61, and the maximum groove depth Dmax1 of the first circumferential narrow groove 33 is preferably smaller than a maximum groove depth Dmax3 of the intermediate lug grooves 51.

By making the maximum groove depth Dmax1 of the first circumferential narrow groove 33 smaller than the maximum groove depth Dmax3 of the intermediate lug grooves 51, high tread rigidity of the continuous land portion in the region 71B can be maintained even when the first circumferential narrow groove 33 is provided. Moreover, by making the maximum groove depth Dmax1 of the first circumferential narrow groove 33 greater than the sipe depth D2 at the connection portion of the sipe 61 with the first circumferential narrow groove 33, the groove volume of the first circumferential narrow groove 33 can be increased, contributing to improvement in the drainage properties.

As illustrated in FIG. 2, the shoulder land portion where the ground contact edge in the tire width direction is positioned is provided on the outer side of the second circumferential main groove 21 in the tire width direction. The shoulder land portion includes the regions 77A and 77B. As illustrated in FIG. 2, the continuous land portion extending in the tire circumferential direction to circumnavigate the outer circumference of the tire 10 is formed in the region 77B. The second circumferential narrow groove 31 is provided in a region where the shoulder land portion is provided. The lug groove 58 extends from the region 77B between the second circumferential main groove 21 and the second circumferential narrow groove 31 toward the outer side in the tire width direction, intersects the second circumferential narrow groove 31, and extends toward the outer side of the second circumferential narrow groove 31 in the tire width direction up to the pattern end.

In this way, since the second circumferential narrow groove 31 is provided in the region of the shoulder land portion, it is possible to suppress a decrease in tread rigidity while exhibiting a drainage function, and therefore, the wet steering stability performance can be improved. Since the lug groove 58 intersects the second circumferential narrow groove 31, water to be drained can flow toward the outer side in the tire width direction through the lug groove 58 that intersects the second circumferential narrow groove 31, which is not achievable in the second circumferential narrow groove 31 in the high-speed region, and therefore, the drainage function can be improved.

According to an embodiment, a length L3 (see FIG. 3) in the tire width direction of the region 77B between the second circumferential main groove 31 and the second circumferential narrow groove 21 is preferably larger than a length L4 in the tire width direction of the region 71B between the first circumferential main groove 23 and the first circumferential narrow groove 33. By setting the length L3 to be greater than the length L4, the tread rigidity of the region 77B positioned on the outer side during turning can be increased, the adhesion friction can be increased by increasing the contact area with the road surface, and the lateral force during turning can be increased. The left side of the drawing in FIG. 2 contributes to increasing the lateral force even when the left side is an inner wheel side during turning.

According to an embodiment, when Lc (see FIG. 3) is the length along the tire circumferential direction between two connection positions in the tire circumferential direction at which two intermediate lug grooves 51 adjacent to each other in the tire circumferential direction among the intermediate lug grooves 51 are connected to the second circumferential main groove 21, a position in the tire circumferential direction of an end of the shoulder lug groove 58 on the side of the second circumferential main groove 21 is preferably within the range of ±30% of the length Lc from the midpoint in the tire circumferential direction between the connection positions as the center (that is, substantially at or near the midpoint). In this manner, by locating the position in the tire circumferential direction of the end of the shoulder lug groove 58 on the side of the second circumferential main groove 21 substantially at the midpoint, the end of the lug groove 58 and an open end of the intermediate lug groove 51 can be disposed to be shifted from each other on the tire circumference. As a result, since the timing of the occurrence of pattern noise caused by the lug grooves 58 and the intermediate lug grooves 51 can be shifted, it is possible to improve the noise performance. The position in the tire circumferential direction of the end of the shoulder lug groove 58 on the side of the second circumferential main groove 21 is more preferably within the range of ±20% of the length Lc from the midpoint as the center.

According to an embodiment, the page left side (that is, the first side) illustrated in FIG. 2 is preferably a vehicle mounting inner side when the tire 10 is mounted on a vehicle. The information indicating that the page left side illustrated in FIG. 2 is mounted on the vehicle mounting inner side is displayed on an information display body by characters, symbols, or the like of the side portion 10S of the tire 10.

By providing the first circumferential main groove 23, the second circumferential main groove 21, the first circumferential narrow groove 33, the intermediate lug groove 51, and the sipe 61 on the page left side illustrated in FIG. 2, wet steering stability performance including drainage properties; and noise performance can be improved. Therefore, in order to increase dry steering stability performance in the tread pattern on the page right side with respect to the tire equator line CL illustrated in FIG. 2, the groove area can be made smaller than that of the tread pattern on the first side.

According to an embodiment, as illustrated in FIG. 2, the tread pattern includes at least two circumferential main grooves 25 and 27 extending in the tire circumferential directions on the second side (the page right side) opposite the first side (the page left side) with respect to the tire equator line CL. In this case, the region 75 of the land portion formed by the circumferential main groove 25 and 27 on the second side; and the region 79 of the shoulder land portion on an outer side of the circumferential main groove 27 in the tire width direction are not provided with a circumferential groove extending in the tire circumferential direction, having a narrower groove width than the circumferential grooves extending in the tire circumferential direction (for example, the circumferential main grooves 25 and 27 on the second side). Since circumferential narrow grooves such as the circumferential narrow grooves 31 and 33 are not provided, the tread rigidity in the regions 75 and 79 can be improved as compared to the corresponding regions on the first side. As a result, wet steering stability performance as well as dry steering stability performance can be improved. Moreover, since the circumferential narrow grooves are not provided in the tread pattern on the second side, noise generated due to the flow of air flowing in the tire circumferential direction can be suppressed, and noise performance can be improved.

According to an embodiment, a circumferential groove that extends in the tire circumferential direction to circumnavigate the tire circumference is not preferably provided in a region between the first circumferential main groove 23 and the circumferential main groove 25 (the third circumferential main groove) closest to the tire equator line among the plurality of circumferential main grooves on the second side. As a result, the initial steering response is accelerated, and the steering stability on wet road surfaces and dry road surfaces is improved. Particularly, since the groove wall of the circumferential main groove 25 (the third circumferential main groove) on the side of the first circumferential main groove 23 is a wall that circumnavigates without interruption in the tire circumferential direction and since there is no lug groove extending from the groove wall, the contact area of the region 73 is increased, the initial steering response is accelerated, and the steering stability is improved more greatly.

According to an embodiment, an inclination direction of each of the sipes 61 in the connection portion of the sipes 61 is preferably set so as to be smoothly connected to one of the intermediate lug grooves 51. Since the sipes 61 are smoothly connected to the intermediate lug grooves 51 at the connection portion, water flows in an extension direction of the intermediate lug grooves 51 connected smoothly without changing the flow direction of a small amount of water flowing through the gap between the sipe 61, which contributes to improving the drainage performance.

Figure 5:
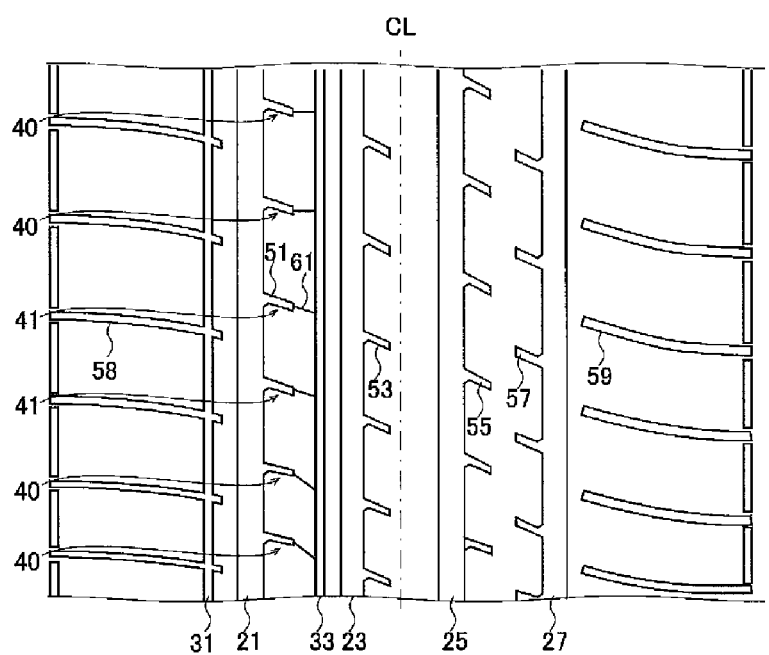
FIG. 5 is a diagram illustrating a tread pattern of a tire according to another embodiment, different from the tread pattern illustrated in FIG. 2.

Moreover, in an embodiment, at least some sipes 61 of the sipes 61 are preferably connected to one of the intermediate lug grooves 51 in a bent manner. In FIG. 2, the bending of the sipes 61 and the intermediate lug grooves 51 is shown in an emphasized manner for understanding. As illustrated in FIG. 2, the lug grooves with sipes 40 and 41 are formed by the intermediate lug grooves 51 and the sipes 61. The lug groove with sipes 40 is a groove in which the intermediate lug groove 51 and the sipe 61 are connected in a bent manner and the lug groove with sipes 41 is a groove in which the intermediate lug groove 51 and the sipe 61 are connected smoothly. In the example illustrated in FIG. 2, the inclination angles of the sipes 61 with respect to the tire width direction are identical, and the inclination angles of the intermediate lug grooves 51 are changed in various directions. As illustrated in FIG. 5, the inclination angles of the intermediate lug grooves 51 with respect to the tire width direction may be identical, and the inclination angles of the sipes 61 may be changed in various directions. FIG. 5 is a diagram illustrating a tread pattern according to another embodiment, different from FIG. 2.

In this case, a threshold angle for distinguishing whether the sipe 61 and the intermediate lug groove 51 are connected in a bent manner or are connected smoothly is preferably a predetermined angle within the range of from 1 to 5°. This threshold angle is, for example, 3°. In this case, the lug groove with sipes when the bending angle is 3° or greater is the lug groove with sipes 40, and the lug groove with sipes when the bending angle is less than 3° is the lug groove with sipes 41. The largest bending angle of the lug groove with sipes 40 is 10° or smaller.

The lug grooves with sipes 40 may include: the lug groove with sipes 40 in which the inclination of the intermediate lug groove 51 with respect to the tire width direction is gentler than the inclination of the sipe 61 with respect to the tire width direction; and the lug groove with sipes 40 in which the inclination of the intermediate lug groove 51 with respect to the tire width direction is abrupter than the inclination of the sipe 61 with respect to the tire width direction. The lug groove with sipes 40 may be the lug groove with sipes 40 in which the inclination of the intermediate lug groove 51 with respect to the tire width direction is abrupter or gentler than the inclination of the sipe 61 with respect to the tire width direction and may be the lug groove with sipes 40 having a plurality of bending angles with respect to the tire width direction.

Similarly, as illustrated in FIG. 5, the lug groove with sipes 40 may include: a lug groove with sipes in which the inclination of the sipe 61 with respect to the tire width direction is abrupter than the inclination of the intermediate lug groove 51 with respect to the tire width direction; and a lug groove with sipes 40 in which the inclination of the sipe 61 with respect to the tire width direction is gentler than the inclination of the intermediate lug groove 51 with respect to the tire width direction. The lug groove with sipes 40 may be a lug groove with sipes 40 in which the inclination of the sipe 61 with respect to the tire width direction is abrupter or gentler than the inclination of the intermediate lug groove 51 with respect to the tire width direction and may be a lug groove with sipes 40 having a plurality of inclination angles with respect to the tire width direction.

In this manner, by bending and connecting the sipe 61 with the intermediate lug groove 51 at at least some of the plurality of connection portions, the directions of the edge components formed by the sipes 61 or the intermediate lug grooves 51 can be changed. Therefore, even if the direction of the force received from the wet road surface changes, the adhesion friction force can be stably exhibited by the edge components the directions of which are changed. Therefore, the wet steering stability can be improved.

A sipe depth D4 (see FIG. 4) at the connection portion of the sipe 61 with one of the intermediate lug grooves 51 is preferably greater than the sipe depth D2 of the connection portion of the sipe 61 with the first circumferential narrow groove 33 and is smaller than the maximum groove depth Dmax3 of the intermediate lug grooves 51. As described above, since the sipe depth D4 is greater than the sipe depth D2 and the portion at the sipe depth D4 of the sipe 61 is connected to the intermediate lug groove 51, it is possible to suppress a large change in tread rigidity and prevent concentration of deformation due to the force received from the road surface of the land portion of the region 71A.

As illustrated in FIG. 2, the groove wall of the first circumferential narrow groove 33 on the side of the first circumferential main groove 23 is preferably a wall that circumnavigates without interruption in the tire circumferential direction. In other words, lug grooves and sipes that are open to the first circumferential narrow groove 33 and the first circumferential main groove 23 are preferably not provided in the region 71B. More preferably, as illustrated in FIG. 2, grooves and sipes as well as the lug grooves and sipes that are open to the first circumferential narrow groove 33 and the first circumferential main groove 23 are preferably not provided at all in the region 71B. Due to this, the entire region 71B can be used as a continuous land portion in which the land portion circumnavigating the outer circumference of the tire 10 has a constant width, the tread rigidity of the region 71B can be increased, the adhesion friction can be increased by increasing the contact area with the road surface, and the wet steering stability performance can be improved.

Example, Comparative Example, and Conventional Example

In order to examine the effects of the tread pattern of the tire 10 described above, tires having various tread patterns changed from the tread pattern illustrated in FIG. 2 as a reference are manufactured, and wet steering stability performance and noise performance are examined. The manufactured tires have a size of 225/65R17.

Tables 1 and 2 show the specifications of the tread patterns of each of the tires and the evaluation results thereof.

In Tables 1 and 2, "presence/absence of intermediate lug grooves 51" refers to whether or not there is a lug groove provided in the region 71A to extend from the second circumferential main groove 21 toward the first circumferential narrow groove 33 and to close without reaching the first circumferential narrow groove 33.

"Presence/absence of sipes 61" refers to whether or not there is a sipe provided in the region 71A to extend from the closed end 51a of each of the intermediate lug grooves 51 to connect the closed end 51a with the first circumferential narrow groove 33. "No" means that in any example, there is a sipe, but the sipe is a sipe that is closed halfway without being connected to the first circumferential narrow groove 33.

In "presence/absence of lug grooves in region 71B," "yes" means that an inclined lug groove open to the circumferential narrow groove 33 is present and "no" means that there is no lug groove in the region 71B.

In "comparison of Dmax1, D2, Dmax3", "Dmax1<Dmax3" means that Dmax3 is 1.0 mm larger than Dmax1 in any example, and "D2<Dmax1" means that Dmax1 is 1.0 mm larger than D2 in any example.

In "comparison of L3 and L4", "L3<L4" means that L4 is 1.5 mm greater than L3 in any example, and "L3>L4" means that L3 is 1.5 mm greater than L4 in any example.

In "presence/absence of second circumferential narrow groove 31," "yes" means that a groove that intersects the lug groove 58 is present and "no" means that a groove that intersects the lug groove 58 is not present.

The inclination angle of the intermediate lug grooves 51 and the sipes 61 with respect to the tire circumferential direction is 75°.

The tires are subjected to the following tests for evaluating wet steering stability performance and noise performance, and the evaluation results are shown in Tables 1 and 2. In each test, tires are assembled on wheels having a rim size of 17×7J, mounted on an SUV (Sport Utility Vehicle) vehicle having an engine displacement of 2400 cc, and inflated to an air pressure of 230 kPa.

Wet Steering Stability Performance A test course of an asphalt road surface, in which a road surface sprayed with a water depth of from 1 to 2 mm is provided in a partial section and in the other sections, a water depth of less than 1 mm is sprayed, is prepared while running along the test course at a speed of from 40 to 100 km/hr, and the test driver performed sensory evaluation on steering performance when changing lanes and when cornering, and stability when traveling straight. In this running, drainage performance can be also evaluated because the vehicle also passes through a road surface with a water depth of from 1 to 2 mm. The wet steering stability performance is displayed as an index value with respect to 100 of Conventional Example, and the larger the index value, the better the wet steering stability performance.

Noise Performance

Each test tire is mounted on an identical SUV vehicle as used in the evaluation test for wet performance, and pass-by noise outside the vehicle is measured in accordance with the European noise regulation conditions (ECE R117). The evaluation results are shown by an index value with respect to 100 of Conventional Example using the reciprocal of the measured value. The larger the index value, the better the noise performance.

TABLE 1

|  | Conventional Example | Comparative Example 1 | Comparative Example 2 | Example 1 |
| --- | --- | --- | --- | --- |
| Presence/absence of intermediate lug grooves 51 | Yes | Yes | Yes | Yes |
| Presence/absence of sipes 61 | No | No | Yes | Yes |
| Presence/absence of first circumferential narrow grooves 33 | Yes | Yes | Yes | Yes |
| Presence/absence of lug grooves in region 71B | Yes | No | Yes | No |
| Comparison of Dmax1, D2, and Dmax3 | D2 = Dmax1 < Dmax3 | D2 = Dmax1 < Dmax3 | D2 = Dmax1 < Dmax3 | D2 = Dmax1 < Dmax3 |
| Comparison of L3 and L4 | L3 = L4 | L3 < L4 | L3 < L4 | L3 < L4 |
| Presence/absence of second circumferential narrow grooves 31 | No | No | No | No |
| First side is vehicle inner side or vehicle outer side | INNER SIDE | INNER SIDE | INNER SIDE | INNER SIDE |
| Wet steering stability performance | 100 | 98 | 102 | 102 |
| Noise performance | 100 | 102 | 98 | 102 |

TABLE 2

|  | Example 2 | Example 3 | Example 4 | Example 5 |
| --- | --- | --- | --- | --- |
| Presence/absence of intermediate lug grooves 51 | Yes | Yes | Yes | Yes |
| Presence/absence of sipes 61 | Yes | Yes | Yes | Yes |
| Presence/absence of first circumferential narrow grooves 33 | Yes | Yes | Yes | Yes |
| Presence/absence of lug grooves in region 71B | No | No | No | No |
| Comparison of Dmax1, D2, and Dmax3 | D2 < Dmax1 < Dmax3 | D2 < Dmax1 < Dmax3 | D2 < Dmax1 < Dmax3 | D2 < Dmax1 < Dmax3 |
| Comparison of L3 and L4 | L3 < L4 | L3 > L4 | L3 > L4 | L3 > L4 |
| Presence/absence of second circumferential narrow grooves 31 | No | No | Yes | Yes |
| First side is vehicle inner side or vehicle outer side | INNER SIDE | INNER SIDE | INNER SIDE | OUTER SIDE |
| Wet steering stability performance | 104 | 106 | 108 | 106 |
| Noise performance | 103 | 103 | 103 | 102 |

From the comparison between Example 1 and Example 2, it can be understood that wet steering stability performance and noise performance are further improved by providing a tread pattern where the intermediate lug grooves 51, the sipes 61, the first circumferential narrow groove 33, the region 71B without a lug groove are present.

Comparing Example 1 with Example 2, it can be seen that wet steering stability performance and noise performance are further improved by making the sipe depth D2<the maximum groove depth Dmax1<the maximum groove depth Dmax3.

From the comparison between Example 2 and Example 3, the wet steering stability performance can be improved by setting such that the length L3>the length L4.

From the comparison between Example 3 and Example 4, it can be understood that the wet steering stability performance is improved by providing the second circumferential narrow groove 31 crossing the lug groove 58.

From the comparison between Example 4 and Example 5, it can be understood that the wet steering stability performance is improved by providing the intermediate lug grooves 51, the sipes 61, and the first circumferential narrow groove 33 in a region of the tread pattern on the vehicle mounting inner side with respect to the tire equator line CL.

The pneumatic tire according to embodiments of the present technology are described above in detail. However, the pneumatic tire according to embodiments of the present technology is not limited to the above-described embodiments or examples and may of course be enhanced or modified in various ways within the scope of the present technology.

The invention claimed is:

1. A pneumatic tire comprising a tread pattern, the tread pattern comprising:
   a first circumferential main groove provided on a first side in a tire width direction with respect to a tire equator line to extend in a tire circumferential direction;
   a second circumferential main groove provided on an outer side of the first circumferential main groove in the tire width direction to extend in the tire circumferential direction;
   a first circumferential narrow groove provided in a region between the first circumferential main groove and the second circumferential main groove to extend in the tire circumferential direction, the first circumferential narrow groove having a narrower groove width than the first circumferential main groove and the second circumferential main groove;
   a plurality of intermediate lug grooves provided in the region to extend from the second circumferential main groove toward the first circumferential narrow groove, the plurality of intermediate lug grooves being closed without reaching the first circumferential narrow groove and disposed at intervals in the tire circumferential direction; and
   a plurality of sipes provided in the region to extend from a closed end of each of the intermediate lug grooves to connect the closed end with the first circumferential narrow groove, the plurality of sipes being disposed at intervals in the tire circumferential direction,
   no lug grooves being provided in a region between the first circumferential main groove and the first circumferential narrow groove, and a groove wall of the first circumferential main groove on a side of the first circumferential narrow groove being a wall that circumnavigates without interruption in the tire circumferential direction, and
   at least some sipes of the sipes being directly connected to one of the intermediate lug grooves at the closed end in a bent manner such that a plurality of lug groove with sipes are formed, sipes and lug grooves of the plurality of the lug groove with sipes being disposed at different regions in the tire width direction,
   wherein the tread Pattern comprises at least two circumferential main grooves extending in the tire circumferential direction on a second side opposite the first side with respect to the tire equator line, and
   a region of a land portion formed by the circumferential main grooves on the second side and a region of a shoulder land portion on an outer side of the circumferential main grooves on the second side in the tire width direction are not provided with a circumferential groove that extends in the tire circumferential direction to circumnavigate a circumference of the tire.

2. The pneumatic tire according to claim 1, wherein the first circumferential narrow groove is provided on a side of the first circumferential main groove in the tire width direction rather than a center position in the tire width direction of the region.

3. The pneumatic tire according to claim 1, wherein a length in the tire width direction of each of the intermediate lug grooves is from 30 to 70% of a length in the tire width direction of a region between the second circumferential main groove and the first circumferential narrow groove.

4. The pneumatic tire according to claim 1, wherein a maximum groove depth of the first circumferential narrow groove is greater than a sipe depth of the sipes at a connection portion of the first circumferential narrow groove with the sipes and is smaller than a maximum groove depth of the intermediate lug grooves.

5. The pneumatic tire according to claim 1, wherein
 a shoulder land portion where a ground contact edge in the tire width direction is located is provided on an outer side of the second circumferential main groove in the tire width direction,
 a second circumferential narrow groove having a narrower groove width than the first circumferential main groove and the second circumferential main groove is provided in a region of the shoulder land portion to extend in the tire circumferential direction, and
 a shoulder lug groove is provided to extend from a region between the second circumferential main groove and the second circumferential narrow groove toward the outer side in the tire width direction, to intersect the second circumferential narrow groove, and to further extend toward an outer side of the second circumferential narrow groove in the tire width direction.

6. The pneumatic tire according to claim 5, wherein a length in the tire width direction of the region between the second circumferential main groove and the second circumferential narrow groove is larger than a length in the tire width direction of a region between the first circumferential main groove and the first circumferential narrow groove.

7. The pneumatic tire according to claim 5, wherein when Lc is a length along the tire circumferential direction between two connection positions in the tire circumferential direction at which two intermediate lug grooves adjacent in the tire circumferential direction among the intermediate lug grooves are connected to the second circumferential main groove, a position in the tire circumferential direction of an end of the shoulder lug groove on a side of the second circumferential main groove is within a range of ±30% of the length Lc from a midpoint in the tire circumferential direction between the connection positions as a center.

8. The pneumatic tire according to claim 1, wherein when the pneumatic tire is mounted on a vehicle, the first side is a vehicle mounting inner side.

9. The pneumatic tire according to claim 1, wherein a region between the first circumferential main groove and a third circumferential main groove closest to the tire equator line among the circumferential main grooves on the second side is not provided with a circumferential groove that extends in the tire circumferential direction to circumnavigate a circumference of the tire.

10. The pneumatic tire according to claim 9, wherein a groove wall of the third circumferential main groove on a side of the first circumferential main groove is a wall that circumnavigates without interruption in the tire circumferential direction.

11. The pneumatic tire according to claim 1, wherein a sipe depth of a connection portion of the sipes with one of the intermediate lug grooves is greater than a sipe depth of a connection portion of the sipes with the first circumferential narrow groove and is smaller than a maximum groove depth of the intermediate lug grooves.

* * * * *